US012589625B2

(12) United States Patent
Yamada et al.

(10) Patent No.: US 12,589,625 B2
(45) Date of Patent: Mar. 31, 2026

(54) VEHICLE CONTROL DEVICE

(71) Applicant: AISIN CORPORATION, Kariya (JP)

(72) Inventors: Ichiji Yamada, Kariya (JP); Akira Kato, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/849,620

(22) PCT Filed: May 11, 2023

(86) PCT No.: PCT/JP2023/017804
§ 371 (c)(1),
(2) Date: Sep. 23, 2024

(87) PCT Pub. No.: WO2023/238598
PCT Pub. Date: Dec. 14, 2023

(65) Prior Publication Data
US 2025/0206095 A1    Jun. 26, 2025

(30) Foreign Application Priority Data

Jun. 9, 2022    (JP) ................................. 2022-093893

(51) Int. Cl.
*B60G 17/0165* (2006.01)
*B60G 17/019* (2006.01)
(Continued)

(52) U.S. Cl.
CPC ... *B60G 17/0165* (2013.01); *B60G 17/01908* (2013.01); *G06V 20/588* (2022.01);
(Continued)

(58) Field of Classification Search
CPC .......... B60G 17/0165; B60G 17/01908; B60G 2400/0511; B60G 2400/0512;
(Continued)

(56) References Cited

U.S. PATENT DOCUMENTS

| | | | | |
|---|---|---|---|---|
| 11,052,910 B2 * | 7/2021 | Honda | ................... | B60W 10/30 |
| 11,104,312 B2 * | 8/2021 | Watanabe | ............. | B60T 8/1764 |

(Continued)

FOREIGN PATENT DOCUMENTS

| | | |
|---|---|---|
| JP | 06-324138 A | 11/1994 |
| JP | 2006-335193 A | 12/2006 |

(Continued)

OTHER PUBLICATIONS

International Search Report for PCT/JP2023/017804, dated Aug. 8, 2023.

*Primary Examiner* — Toan C To
(74) *Attorney, Agent, or Firm* — Sughrue Mion, PLLC

(57) ABSTRACT
A vehicle control device includes an analysis unit configured to analyze a road surface condition based on a captured image that is captured by an imaging device that captures an image of a road surface in a traveling direction of a vehicle, a switching unit configured to switch a control mode indicating a level of control related to traveling of the vehicle based on the road surface condition and a vehicle characteristic that is based on detection information from an on-board sensor, and a control unit configured to control the vehicle in the control mode selected by switching.

11 Claims, 9 Drawing Sheets

(51) Int. Cl.
   *G06V 20/56*          (2022.01)
   *B60W 30/182*        (2020.01)

(52) U.S. Cl.
   CPC ................. *B60G 2400/0511* (2013.01); *B60G 2400/0512* (2013.01); *B60G 2400/102* (2013.01); *B60G 2400/104* (2013.01); *B60G 2400/106* (2013.01); *B60G 2400/821* (2013.01); *B60G 2401/14* (2013.01); *B60W 30/182* (2013.01)

(58) Field of Classification Search
   CPC ........ B60G 2400/102; B60G 2400/104; B60G 2400/106; B60G 2400/821; B60G 2401/14; G06V 20/588; B60W 30/182
   See application file for complete search history.

(56)                References Cited

U.S. PATENT DOCUMENTS 12,384,218  B1 *  8/2025  Gwidt ............. B60G 17/01908

| | | | | |
|---|---|---|---|---|
| 2008/0243334 | A1 * | 10/2008 | Bujak ................ | B60G 17/0195 |
| | | | | 701/37 |
| 2017/0364070 | A1 * | 12/2017 | Oba ....................... | B60W 50/08 |
| 2019/0202440 | A1 | 7/2019 | Watanabe | |
| 2019/0344801 | A1 * | 11/2019 | Ishii ...................... | G06V 20/582 |
| 2021/0162832 | A1 * | 6/2021 | Hwang ................. | B60G 17/06 |
| 2021/0291610 | A1 * | 9/2021 | Goto ...................... | B60G 17/06 |
| 2022/0032955 | A1 * | 2/2022 | Xiang ................. | B60W 50/029 |
| 2022/0055659 | A1 * | 2/2022 | Zhang .................... | B60K 35/28 |
| 2023/0027706 | A1 * | 1/2023 | Kim ................... | B60G 17/0165 |
| 2024/0317008 | A1 * | 9/2024 | Giovanardi ............ | G01C 21/30 |
| 2025/0091584 | A1 * | 3/2025 | Kim ........................ | B60G 17/06 |
| 2025/0111683 | A1 * | 4/2025 | Nabatame ........... | G06V 20/586 |
| 2025/0115091 | A1 * | 4/2025 | Kim .................. | B60G 17/0165 |

FOREIGN PATENT DOCUMENTS

| | | | |
|---|---|---|---|
| JP | 2009-214737 | A | 9/2009 |
| JP | 2011-068235 | A | 4/2011 |
| JP | 2013-147114 | A | 8/2013 |
| JP | 2019-119219 | A | 7/2019 |

* cited by examiner

FIG. 5

| MODE | DAMPING FORCE CONTROL | SPRING CONSTANT SWITCHING | STEERING CONTROL | STABILIZER CONTROL |
|---|---|---|---|---|
| COMFORT | SOFT | SOFT | CONTROL GAIN: LOW | SOFT |
| NORMAL | NORMAL | NORMAL | CONTROL GAIN: MEDIUM | NORMAL |
| SPORT | HARD | HARD | CONTROL GAIN: HIGH | HARD |

FIG. 6

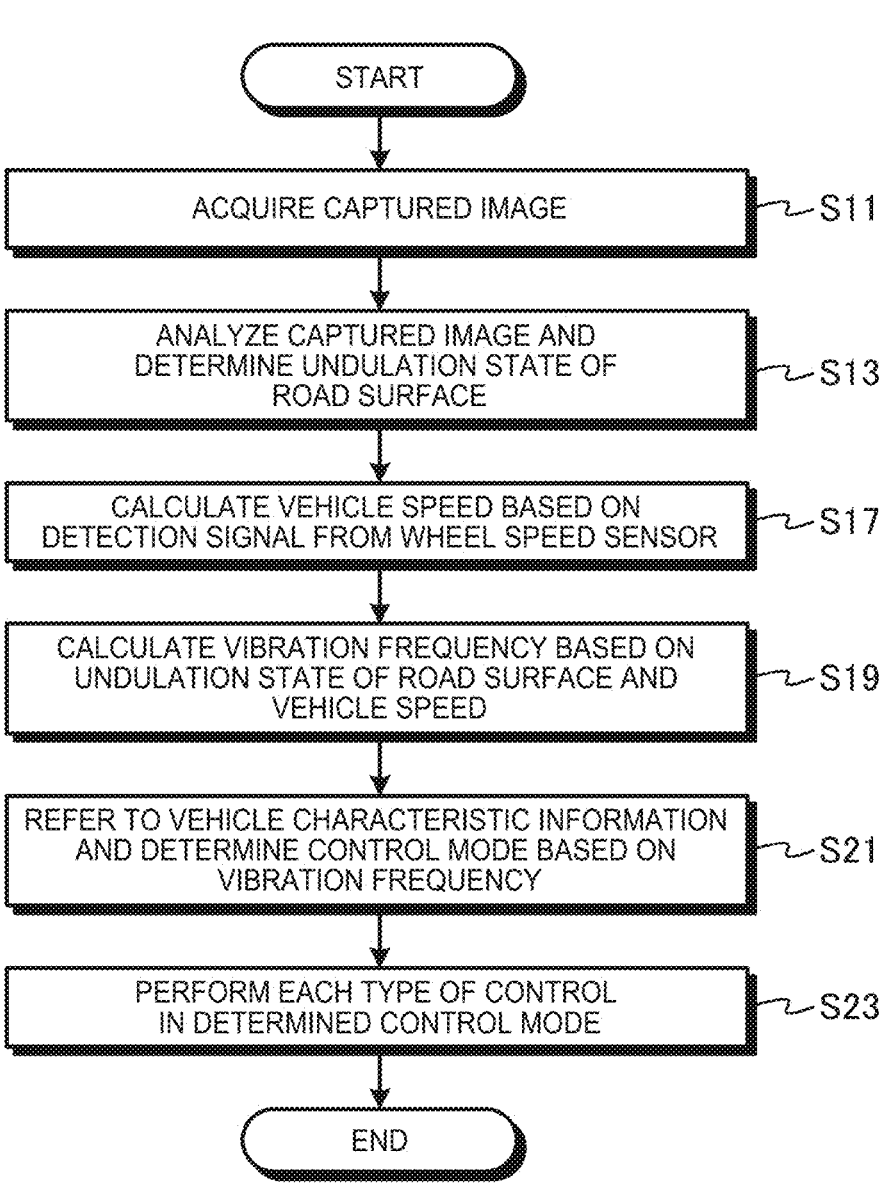

START

ACQUIRE CAPTURED IMAGE — S11

ANALYZE CAPTURED IMAGE AND DETERMINE UNDULATION STATE OF ROAD SURFACE — S13

CALCULATE VEHICLE SPEED BASED ON DETECTION SIGNAL FROM WHEEL SPEED SENSOR — S17

CALCULATE VIBRATION FREQUENCY BASED ON UNDULATION STATE OF ROAD SURFACE AND VEHICLE SPEED — S19

REFER TO VEHICLE CHARACTERISTIC INFORMATION AND DETERMINE CONTROL MODE BASED ON VIBRATION FREQUENCY — S21

PERFORM EACH TYPE OF CONTROL IN DETERMINED CONTROL MODE — S23

END

VEHICLE CONTROL DEVICE

CROSS REFERENCE TO RELATED APPLICATIONS

This application is a National Stage of International Application No. PCT/JP2023/017804 filed May 11, 2023, claiming priority based on Patent Japanese Application No. 2022-093893 filed Jun. 9, 2022, the entire contents of which are incorporated in their entirety.

TECHNICAL FIELD

Embodiments of the present disclosure relate to a vehicle control device.

BACKGROUND ART

In device control for ride comfort, handling stability, etc. in vehicles, users such as a driver or occupant have conventionally switch control modes such as comfort, normal, and sport by a manual operation such as a switch operation. In conventional technologies, while a vehicle is traveling, various devices for ride comfort, handling stability, etc. are controlled to optimize vehicle characteristics based on detection values from various on-board sensors such as a vertical acceleration sensor and a vehicle height sensor.

Related Art Documents

Patent Documents

Patent Document 1: Japanese Unexamined Patent Application Publication No. 2013-147114 (JP 2013-147114 A)

SUMMARY OF THE DISCLOSURE

Problem to be Solved by the Various Aspects of the Disclosure

In such conventional technologies, however, the control modes are switched by the manual operation by the user based on his or her visual and sensory judgment. Therefore, the operation is complicated for the user and a burden is imposed on both.

Means for Solving the Problem

A vehicle control device of an embodiment includes an analysis unit configured to analyze a road surface condition based on a captured image that is captured by an imaging device that captures an image of a road surface in a traveling direction of a vehicle, a switching unit configured to switch a control mode indicating a level of control related to traveling of the vehicle based on the road surface condition and a vehicle characteristic that is based on detection information from an on-board sensor, and a control unit configured to control the vehicle in the control mode selected by switching. With this configuration, it is possible to, for example, switch to an optimum control mode based on the vehicle characteristic in response to the road surface condition, thereby reducing the burden on the user. With this configuration, even when there is no driver and the occupant is unable to grasp the road surface condition as in a case where the vehicle is an autonomous vehicle, the control mode can be switched to an optimum control mode based on the vehicle characteristic in response to the undulation state of the road surface, which is convenient for the occupant.

In the vehicle control device of the embodiment, the vehicle characteristic includes a heave-related characteristic, a roll-related characteristic, or a pitch-related characteristic of the vehicle that is based on a vertical acceleration, a lateral acceleration, or a longitudinal acceleration detected by an acceleration sensor serving as the on-board sensor or a vehicle height of the vehicle detected by a vehicle height sensor serving as the on-board sensor. With this configuration, it is possible to, for example, switch to a more optimum control mode based on the heave, roll, or pitch characteristic of the vehicle in response to the road surface condition, thereby further reducing the burden on the user.

In the vehicle control device of the embodiment, the analysis unit is configured to determine, as the road surface condition, an undulation state of the road surface as rough, normal, or flat, and the switching unit is configured to switch the control mode among a plurality of modes with different intensities of control as the levels based on the undulation state of the road surface and the vehicle characteristic. With this configuration, it is possible to, for example, switch to an optimum control mode based on the vehicle characteristic in response to the undulation state of the road surface, thereby further reducing the burden on the user.

In the vehicle control device of the embodiment, the control mode associated with the road surface condition and the vehicle characteristic is determined in advance, and the switching unit is configured to switch the control mode to the control mode determined in association with the road surface condition and the vehicle characteristic. With this configuration, for example, when the vehicle characteristic is determined in advance before shipment, the vehicle to be shipped need not be equipped with the on-board sensor for determining the vehicle characteristic, thereby reducing the mounting space in the vehicle and the manufacturing costs of the vehicle.

The vehicle control device of the embodiment further includes a learning unit configured to input and learn the road surface condition and the detection information while the vehicle is traveling, and change the control mode determined in advance for the vehicle characteristic that is based on the road surface condition and the detection information. The switching unit is configured to switch the control mode to the changed control mode. With this configuration, for example, the threshold value for switching the control mode can be dynamically changed while the vehicle is traveling. Thus, the control mode can be switched to an optimum control mode in response to the road surface condition, thereby further reducing the burden on the user.

In the vehicle control device of the embodiment, the switching unit is configured to calculate a frequency of the undulation state of the road surface based on the road surface condition and a speed of the vehicle, and switch the control mode based on the calculated frequency and the vehicle characteristic. With this configuration, it is possible to, for example, switch to a more optimum control mode based on the vehicle characteristic in response to the undulation state of the road surface, thereby further reducing the burden on the user.

In the vehicle control device of the embodiment, the switching unit is further configured to switch the control mode based on the road surface condition and the vehicle characteristic that is based on noise generated due to the road surface condition. With this configuration, for example, the road surface condition can be recognized with higher accuracy. Thus, the control mode can be switched to a more optimum control mode based on the vehicle characteristic in response to the road surface condition, thereby reducing the burden on the user more accurately.

In the vehicle control device of the embodiment, the control unit includes a damping force control unit configured to perform damping force control on a suspension of the vehicle, and the switching unit is configured to, based on the undulation state of the road surface and the vehicle characteristic, switch the control mode among a normal mode in which the damping force control is performed by the damping force control unit at a normal intensity, a comfort mode in which the damping force control is performed at an intensity lower than the intensity in the normal mode, and a sport mode in which the damping force control is performed at an intensity higher than the intensity in the normal mode. With this configuration, it is possible to, for example, switch to an optimum control mode based on the vehicle characteristic in response to the road surface condition, thereby reducing the burden on the user.

In the vehicle control device of the embodiment, the switching unit is further configured to switch the control mode based on the road surface condition and the vehicle characteristic that is based on an acceleration of a rod of a shock absorber of the suspension or a sprung acceleration or an unsprung acceleration of the suspension. With this configuration, for example, the road surface condition can be recognized with higher accuracy. Thus, the control mode can be switched to a more optimum control mode based on the vehicle characteristic in response to the road surface condition, thereby reducing the burden on the user more accurately.

In the vehicle control device of the embodiment, the control unit includes a spring constant switching control unit configured to perform spring constant switching control on a suspension of the vehicle, and the switching unit is configured to, based on the undulation state of the road surface and the vehicle characteristic, switch the control mode among a normal mode in which the spring constant switching control is performed by the spring constant switching control unit at a normal intensity, a comfort mode in which the spring constant switching control is performed at an intensity lower than the intensity in the normal mode, and a sport mode in which the spring constant switching control is performed at an intensity higher than the intensity in the normal mode. With this configuration, it is possible to, for example, switch to an optimum control mode based on the vehicle characteristic in response to the road surface condition, thereby reducing the burden on the user.

In the vehicle control device of the embodiment, the control unit includes a steering control unit configured to perform steering control on a steering system of the vehicle, and the switching unit is configured to, based on the undulation state of the road surface and the vehicle characteristic, switch the control mode among a normal mode in which a control gain in the steering control by the steering control unit is set to a normal level, a comfort mode in which the control gain is set to a level lower than the level in the normal mode, and a sport mode in which the control gain is set to a level higher than the level in the normal mode. With this configuration, it is possible to, for example, switch to an optimum control mode based on the vehicle characteristic in response to the road surface condition, thereby reducing the burden on the user.

In the vehicle control device of the embodiment, the control unit includes a stabilizer control unit configured to perform stabilizer control on the vehicle, and the switching unit is configured to, based on the undulation state of the road surface and the vehicle characteristic, switch the control mode among a normal mode in which the stabilizer control is performed by the stabilizer control unit at a normal intensity, a comfort mode in which the stabilizer control is performed at an intensity lower than the intensity in the normal mode, and a sport mode in which the stabilizer control is performed at an intensity higher than the intensity in the normal mode. With this configuration, it is possible to, for example, switch to an optimum control mode based on the vehicle characteristic in response to the road surface condition, thereby reducing the burden on the user.

BRIEF DESCRIPTION OF THE DRAWINGS

FIG. 1 is an exemplary perspective view showing a state in which part of a vehicle cabin of a vehicle according to a first embodiment is seen through.

FIG. 5 is an explanatory diagram showing the state of levels in individual types of control set in control modes in the first embodiment.

FIG. 6 is a flowchart showing an example of a procedure of a vehicle control process to be performed by the vehicle control system according to the first embodiment.

MODES FOR CARRYING OUT THE ASPECTS OF THE DISCLOSURE

Exemplary embodiments of the present disclosure will be disclosed below. Configurations of the embodiments described below and actions, results, and effects attained by the configurations are examples. The present disclosure can be realized by configurations other than those disclosed in the following embodiments, and it is possible to obtain at least one of various effects based on the basic configuration and derivative effects.

First Embodiment

A vehicle 1 of the present embodiment may be, for example, an automobile using an internal combustion engine (not shown) as a drive source, that is, an internal combustion engine automobile, an automobile using an electric motor (not shown) as a drive source, that is, an electric automobile or a fuel cell automobile, a hybrid automobile using both of these as drive sources, or an automobile including another drive source. The vehicle 1 may include various transmissions, and may also include various devices such as systems and components required to drive the internal combustion engine and the electric motor. The type, number, layout, etc. of devices related to driving of wheels 3 of the vehicle 1 may be set in various ways.

Figure 1:
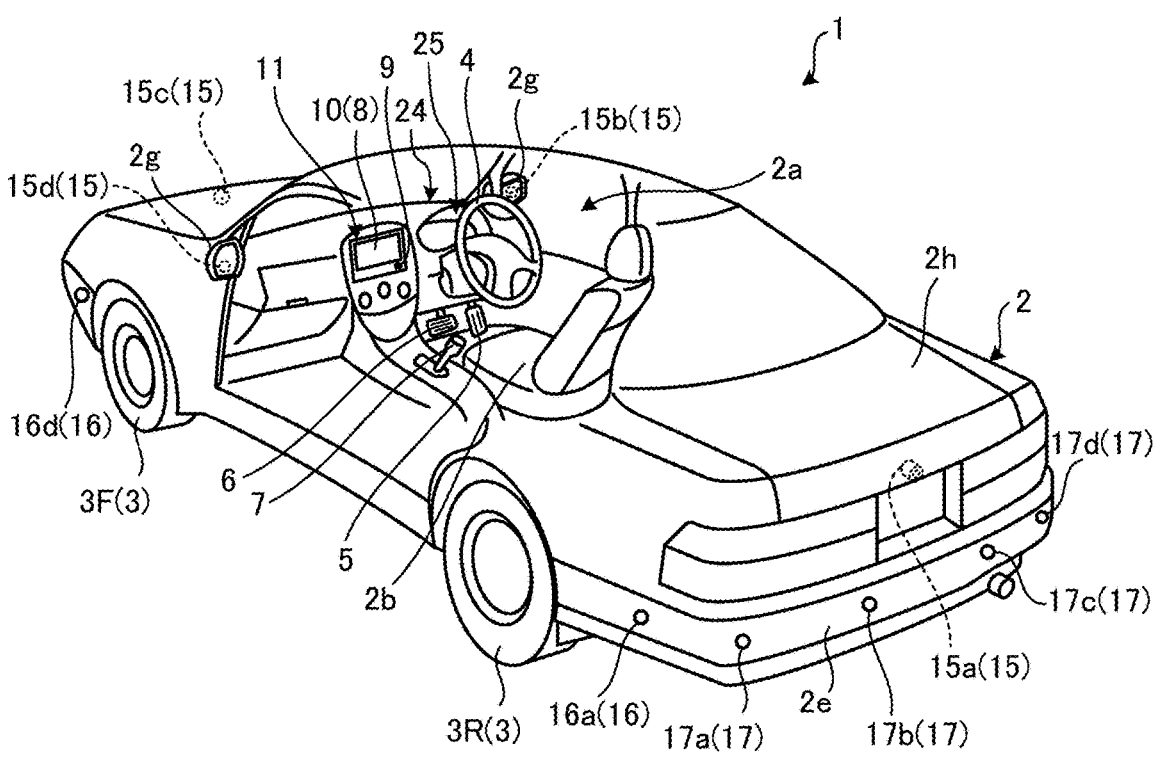
Figure 2:
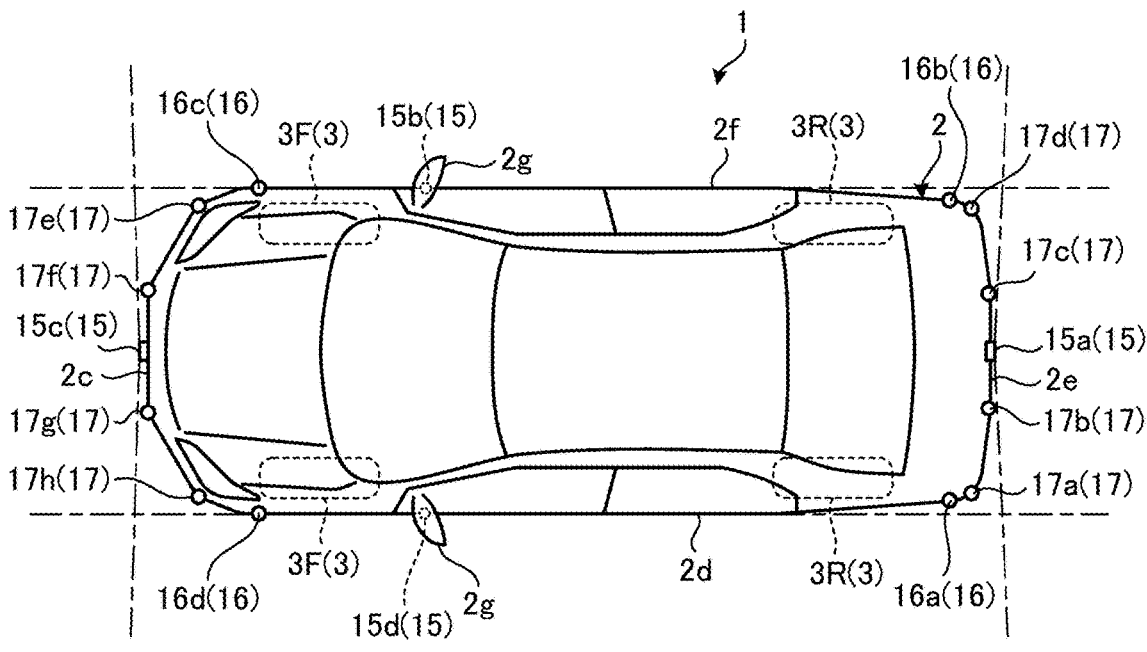
FIG. 2 is an exemplary plan view of the vehicle according to the first embodiment.
Figure 3:
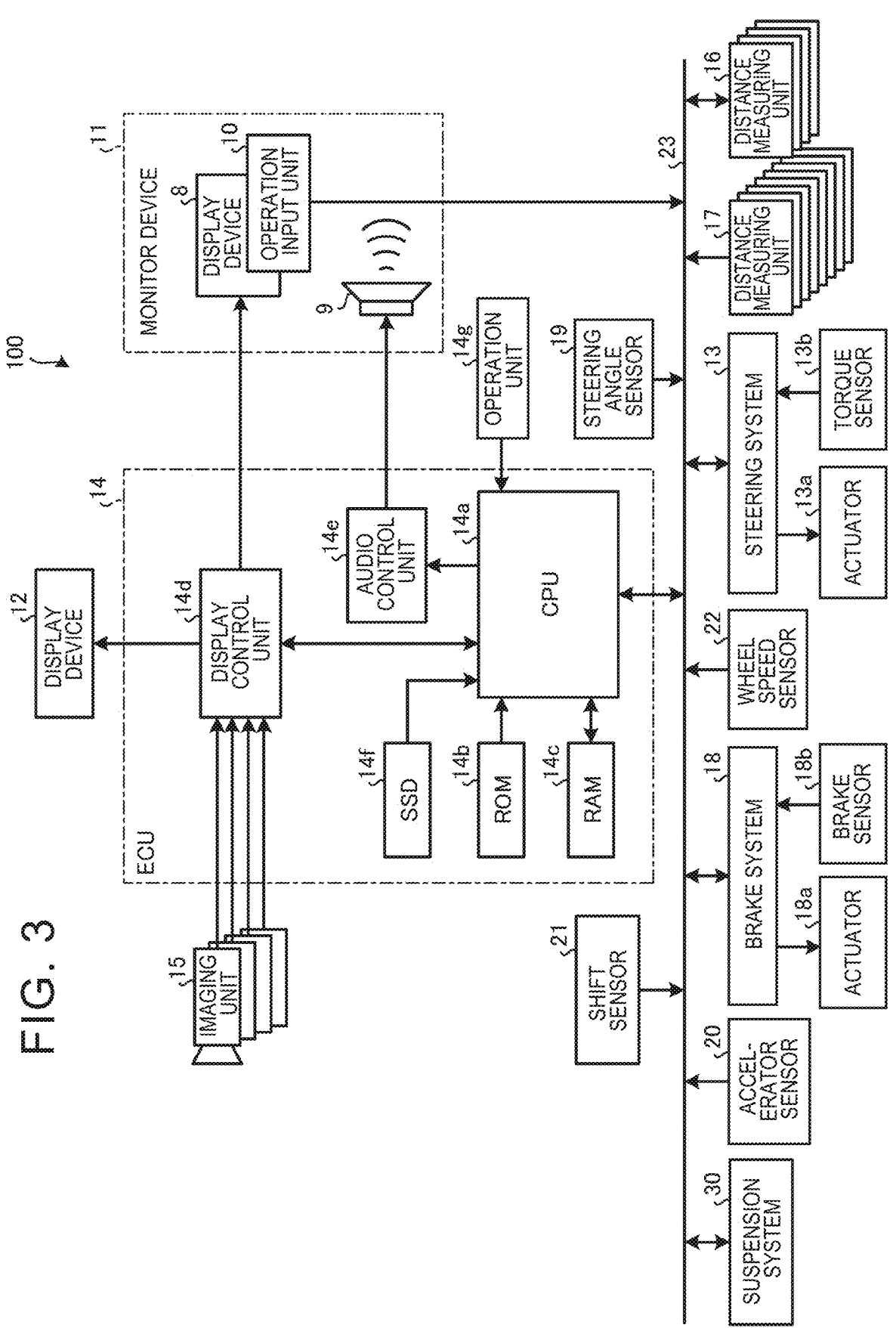
FIG. 3 is an exemplary block diagram of a configuration of a vehicle control system of the vehicle according to the first embodiment.

FIG. 1 is an exemplary perspective view showing a state in which part of a vehicle cabin of the vehicle according to the first embodiment is seen through. FIG. 2 is an exemplary plan view of the vehicle according to the first embodiment. FIG. 3 is an exemplary block diagram of a configuration of a vehicle control system of the vehicle according to the first embodiment.

First, an example of the configuration of the vehicle 1 according to the present embodiment will be described with reference to FIGS. 1 to 3.

As illustrated in FIG. 1, a vehicle body 2 defines a vehicle cabin 2a in which occupants (not shown) ride. A steering unit 4, an acceleration operation unit 5, a braking operation unit 6, a shifting operation unit 7, etc. are provided in the vehicle cabin 2a while facing a seat 2b for a driver as the occupant.

The steering unit 4 is, for example, a steering wheel protruding from a dashboard 24. The acceleration operation unit 5 is, for example, an accelerator pedal positioned near the driver's feet. The braking operation unit 6 is, for example, a brake pedal positioned near the driver's feet. The shifting operation unit 7 is, for example, a shift lever protruding from a center console. The steering unit 4, the acceleration operation unit 5, the braking operation unit 6, the shifting operation unit 7, etc. are not limited to these.

A display device 8 serving as a display output unit and an audio output device 9 serving as an audio output unit are provided in the vehicle cabin 2a. The display device 8 is, for example, an LCD (Liquid Crystal Display) or an OELD (Organic Electro-Luminescent Display). The audio output device 9 is, for example, a speaker. The display device 8 is covered with a transparent operation input unit 10 such as a touch panel. The occupant can view an image displayed on a display screen of the display device 8 via the operation input unit 10. The occupant can perform operation input by touching, pressing, or moving the operation input unit 10 with a finger etc. at a position associated with the image displayed on the display screen of the display device 8.

The display device 8, the audio output device 9, the operation input unit 10, etc. are provided on a monitor device 11 positioned, for example, at the center of the dashboard 24 in a vehicle width direction, that is, in a lateral direction. The monitor device 11 may include an operation input unit (not shown) such as a switch, a dial, a joystick, or a push button. An audio output device (not shown) may be provided at a position other than that of the monitor device 11 in the vehicle cabin 2a, and audio may be output from the audio output device 9 of the monitor device 11 and the other audio output device. The monitor device 11 may also function as, for example, a navigation system or an audio system. A display device 12 separate from the display device 8 is provided in the vehicle cabin 2a.

As illustrated in FIGS. 1 and 2, the vehicle 1 is, for example, a four-wheeled vehicle, and includes two right and left front wheels 3F and two right and left rear wheels 3R. All of the four wheels 3 are steerable. As illustrated in FIG. 3, the vehicle 1 includes a steering system 13 for steering at least two wheels 3.

The steering system 13 includes an actuator 13a and a torque sensor 13b. The steering system 13 is electrically controlled by an ECU 14 (Electronic Control Unit) etc. to operate the actuator 13a. The steering system 13 is, for example, an electric power steering system or an SBW (Steer By Wire) system. The steering system 13 supplements a steering force by applying torque, that is, assist torque, to the steering unit 4 via the actuator 13a, and steers the wheels 3 via the actuator 13a. In this case, the actuator 13a may steer one wheel 3 or a plurality of wheels 3. The torque sensor 13b detects, for example, torque applied to the steering unit 4 by the driver.

As illustrated in FIG. 2, the vehicle body 2 is provided with, for example, four imaging units 15a to 15d as a plurality of imaging units 15. The imaging unit 15 is a digital camera incorporating an imaging element such as a CCD (Charge Coupled Device) or a CIS (CMOS Image Sensor). The imaging unit 15 can output moving image data at a predetermined frame rate. The imaging units 15 each include a wide-angle lens or a fisheye lens, and can capture an image in a range of, for example, 140° to 190° in a horizontal direction. The optical axes of the imaging units 15 are set obliquely downward. Therefore, the imaging unit 15 sequentially captures images of an external environment around the vehicle body 2, including a road surface where the vehicle I can move and an area where the vehicle 1 can be parked, and outputs the images as captured image data.

The imaging unit 15a is positioned, for example, at a rear end 2e of the vehicle body 2, and is provided on a wall below a rear trunk door 2h. The imaging unit 15b is positioned, for example, at a right end 2f of the vehicle body 2, and is provided on a right door mirror 2g. The imaging unit 15c is positioned, for example, at a front side of the vehicle body 2, that is, at a front end 2c in a vehicle longitudinal direction, and is provided on a front bumper etc. The imaging unit 15d is positioned, for example, at a left side of the vehicle body 2, that is, at a left end 2d in the vehicle width direction, and is provided on a left door mirror 2g serving as a protrusion. The ECU 14 performs arithmetic processing and image processing based on image data obtained by the plurality of imaging units 15, and can generate an image at a wider viewing angle or a virtual overhead image of the vehicle 1 viewed from above. The overhead image can also be called a planar image.

In the present embodiment, an image of the road surface ahead in the traveling direction of the vehicle 1 is captured by the imaging unit 15c serving as an imaging device provided on the front side of the vehicle body 2. When the vehicle 1 moves rearward, the rear of the vehicle 1 becomes the traveling direction, and the imaging unit 15a may capture an image of the road surface behind the vehicle 1.

As illustrated in FIGS. 1 and 2, the vehicle body 2 is provided with, for example, four distance measuring units 16a to 16d and eight distance measuring units 17a to 17h as a plurality of distance measuring units 16, 17. The distance measuring units 16, 17 are, for example, sonar devices that emit ultrasonic waves and capture the reflected waves. The sonar devices can also be called sonar sensors or ultrasonic detectors. Based on detection results from the distance measuring units 16, 17, the ECU 14 can measure the presence or absence of objects such as obstacles positioned around the vehicle 1 and the distances to the objects. That is, the distance measuring units 16, 17 are examples of a detection unit that detects an object. The distance measuring unit 17 can be used, for example, to detect an object at a relatively short distance, and the distance measuring unit 16 can be used, for example, to detect an object at a relatively longer distance than that for the distance measuring unit 17. The distance measuring unit 17 can be used, for example, to detect an object ahead of or behind the vehicle 1, and the distance measuring unit 16 can be used to detect an object on the side of the vehicle 1.

As illustrated in FIG. 3, in the vehicle control system 100, a brake system 18, a suspension system 30, a steering angle sensor 19, an accelerator sensor 20, a shift sensor 21, a wheel speed sensor 22, etc. are electrically connected via an in-vehicle network 23 serving as an electrical communication line in addition to the ECU 14, the monitor device 11, the steering system 13, the distance measuring units 16, 17, etc. The in-vehicle network 23 is, for example, a CAN (controller area network).

The ECU 14 can control the steering system 13, the brake system 18, etc. by sending control signals via the in-vehicle network 23. The ECU 14 can receive detection results from the torque sensor 13b, a brake sensor 18b, the steering angle sensor 19, the distance measuring units 16, the distance measuring units 17, the accelerator sensor 20, the shift sensor 21, the wheel speed sensor 22, etc. and operation signals from the operation input unit 10 etc. via the in-vehicle network 23.

The ECU 14 includes, for example, a CPU 14a (Central Processing Unit), a ROM (Read Only Memory) 14b, a RAM (Random Access Memory) 14c, a display control unit 14d, an audio control unit 14e, and an SSD (Solid State Drive, flash memory) 14f.

The CPU 14a can perform various types of arithmetic processing and control such as image processing related to images to be displayed on the display devices 8, 12, determination of a target position of the vehicle 1, calculation of a movement route of the vehicle 1, determination as to whether there is interference with an object, autonomous control of the vehicle 1, termination of the autonomous control, damping control of the suspension system 30, spring constant switching control, steering control, and stabilizer control. The CPU 14a can read a program installed and stored in a non-volatile storage device such as the ROM 14b, and perform arithmetic processing in accordance with the program.

The RAM 14c temporarily stores various types of data to be used in calculations by the CPU 14a. Of the arithmetic processing in the ECU 14, the display control unit 14d mainly performs image processing using image data obtained by the imaging units 15, synthesis of image data to be displayed on the display device 8, etc. Of the arithmetic processing in the ECU 14, the audio control unit 14e mainly performs processing of audio data to be output by the audio output device 9. The SSD 14f is a rewritable non-volatile storage unit, and can store data even when the power supply to the ECU 14 is turned off. The CPU 14a, the ROM 14b, the RAM 14c, etc. may be integrated in the same package. The ECU 14 may use any other logical arithmetic processor such as a DSP (Digital Signal Processor), a logic circuit, etc. instead of the CPU 14a. An HDD (Hard Disk Drive) may be provided instead of the SSD 14f, or the SSD 14f and the HDD may be provided separately from the ECU 14.

The brake system 18 may be, for example, an ABS (Anti-lock Brake System) that suppresses locking of brakes, a skid prevention device (ESC: Electronic Stability Control) that suppresses a skid of the vehicle 1 during cornering, an electric brake system that enhances a braking force (performs brake assist), or a BBW (Brake By Wire). The brake system 18 applies a braking force to the wheels 3 and thus to the vehicle 1 via an actuator 18a. The brake system 18 can detect signs of brake lock, idling of the wheels 3, skid, etc. based on a difference in rotation between the right and left wheels 3, and perform various types of control. The brake sensor 18b is, for example, a sensor that detects the position of a movable part of the braking operation unit 6. The brake sensor 18b can detect the position of the brake pedal as the movable part. The brake sensor 18b includes a displacement sensor.

The steering angle sensor 19 is a sensor that detects the amount of steering of the steering unit 4 such as a steering wheel. The steering angle sensor 19 uses, for example, a Hall element. The ECU 14 acquires the amount of steering of the steering unit 4 by the driver, the amount of steering of each wheel 3 during automated steering, etc. from the steering angle sensor 19, and performs various types of control. The steering angle sensor 19 detects a rotation angle of a rotating part included in the steering unit 4.

The accelerator sensor 20 is, for example, a sensor that detects the position of a movable part of the acceleration operation unit 5. The accelerator sensor 20 can detect the position of the accelerator pedal as the movable part. The accelerator sensor 20 includes a displacement sensor.

The shift sensor 21 is, for example, a sensor that detects the position of a movable part of the shifting operation unit 7. The shift sensor 21 can detect the positions of a lever, an arm, a button, etc. as the movable part. The shift sensor 21 may include a displacement sensor, or may be a switch.

The wheel speed sensor 22 is a sensor that detects the amount of rotation of the wheels 3 and the number of rotations per unit time. The wheel speed sensor 22 outputs the number of wheel speed pulses indicating the detected number of rotations as a sensor value. The wheel speed sensor 22 may use, for example, a Hall element. The ECU 14 calculates the amount of movement of the vehicle 1, etc. based on the sensor value acquired from the wheel speed sensor 22, and performs various types of control. The wheel speed sensor 22 may be provided in the brake system 18. In this case, the ECU 14 acquires the detection result from the wheel speed sensor 22 via the brake system 18.

The suspension system 30 is disposed between the vehicle body 2 and the wheels 3 of the vehicle 1. The suspension system 30 includes springs that absorb vibrations of the vehicle 1 caused by impacts on the vehicle 1 from a road surface, and adjustable dampers that can damp the vibrations of the springs and change the damping forces for the spring vibrations. In the present embodiment, the suspension system 30 cooperates with the ECU 14 to control damping force adjusting devices such as solenoid actuators to change the damping forces of the adjustable dampers. Thus, the suspension system 30 implements an AVS (Adaptive Variable Suspension System) that damps vibrations in the vertical, lateral, and longitudinal directions on the vehicle body caused by impacts on the vehicle 1 from a road surface.

The configurations, dispositions, electrical connection forms, etc. of the various sensors and actuators described above are examples, and can be set (changed) in various ways.

Figure 4:
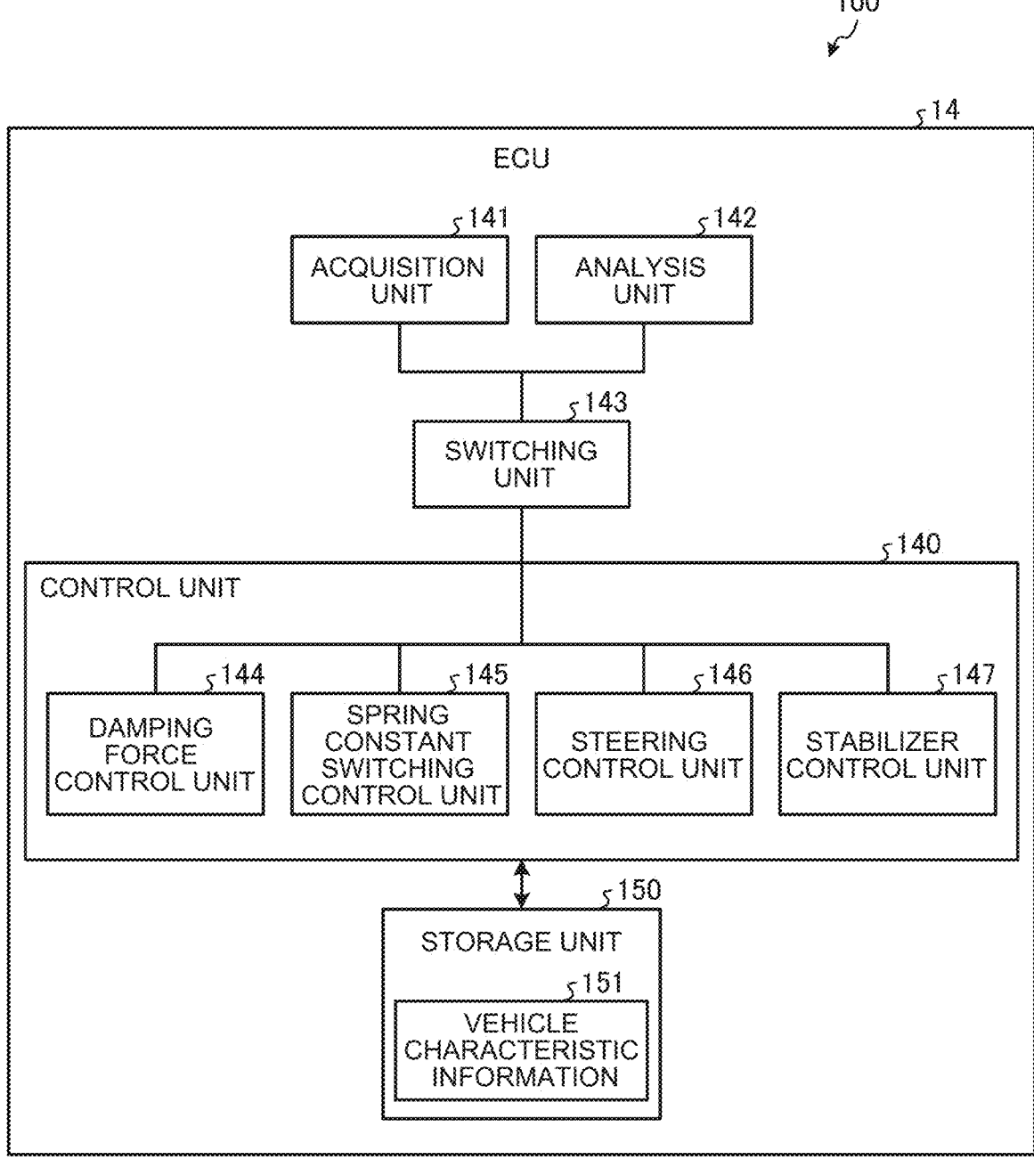
FIG. 4 is a diagram showing an example of a functional configuration of an ECU of the vehicle according to the first embodiment.

Next, an example of a functional configuration of the ECU 14 of the vehicle 1 according to the present embodiment will be described with reference to FIG. 4. FIG. 4 is a diagram showing the example of the functional configuration of the ECU 14 of the vehicle according to the first embodiment.

As shown in FIG. 4, the ECU 14 according to the present embodiment functions as a vehicle control device including at least an acquisition unit 141, an analysis unit 142, a switching unit 143, a control unit 140, and a storage unit 150. As shown in FIG. 4, the control unit 140 mainly includes a damping force control unit 144, a spring constant switching control unit 145, a steering control unit 146, and a stabilizer control unit 147.

The various functional modules such as the acquisition unit 141, the analysis unit 142, the switching unit 143, the damping force control unit 144, the spring constant switching control unit 145, the steering control unit 146, and the stabilizer control unit 147 are examples, and the functional modules may be integrated or subdivided as long as they can implement similar functions.

The acquisition unit 141 acquires detection information from various sensors such as the wheel speed sensor 22 and the steering angle sensor 19. The acquisition unit 141 also acquires a captured image of a road surface in the traveling direction of the vehicle 1 that is captured by the imaging unit 15c.

The analysis unit 142 analyzes a road surface condition based on the captured image acquired by the acquisition unit 141. Specifically, the analysis unit 142 analyzes the captured image and determines, as the road surface condition, an undulation state of the road surface as rough, normal, or flat.

The storage unit 150 corresponds to the SSD 14f, the ROM 14b, etc. The storage unit 150 stores vehicle characteristic information 151 in advance from the time of shipment of the vehicle 1.

The vehicle characteristic information 151 stores vehicle characteristics that are characteristics related to the vehicle 1 in association with control modes as threshold values for switching the control modes. There are three control modes that are a comfort mode, a normal mode, and a sport mode. The control modes will be described in detail later.

The vehicle characteristic information 151 is prepared in advance before the shipment of the vehicle 1. That is, the vehicle 1 is equipped with on-board sensors, and the undulation state of the road surface is determined based on an image captured by the imaging unit 15c while the vehicle is traveling. The frequency of vibration of the vehicle 1 is determined based on the undulation information and the vehicle speed based on the wheel speed sensor 22. Based on the undulation state, the vibration frequency, and vehicle characteristics determined based on detection information from the on-board sensors, the vehicle characteristics are associated with the control modes suitable for the vehicle characteristics and registered in the vehicle characteristic information 151. In the present embodiment, for example, a vertical acceleration sensor, a lateral acceleration sensor, a longitudinal acceleration sensor, and a vehicle height sensor are used as the on-board sensors, and the vehicle characteristics are determined based on detection information from these sensors. Optimum control modes are associated with the ranges of the vehicle characteristics and stored in the storage unit 150 as the vehicle characteristic information 151. That is, the vehicle characteristics are registered in the vehicle characteristic information 151 in association as the threshold values for switching the control modes.

The vehicle characteristics include heave-related characteristics such as a heave speed of the vehicle 1 based on an acceleration acting in the vertical direction of the vehicle 1 detected by the vertical acceleration sensor and a vehicle height detected by the vehicle height sensor, roll-related characteristics such as a roll speed of the vehicle 1 based on an acceleration acting in the width direction (i.e., the lateral direction) of the vehicle 1 detected by the lateral acceleration sensor and a pitch-related characteristics such as a pitch speed and a pitch rate of the vehicle 1 based on an acceleration acting in the longitudinal direction of the vehicle 1 detected by the longitudinal acceleration sensor.

In the present embodiment, these on-board sensors are temporarily attached to the vehicle 1 before the shipment of the vehicle 1. After the vehicle characteristics are determined, they are removed from the vehicle 1, and the vehicle 1 is shipped.

The switching unit 143 switches the control modes based on the road surface condition analyzed by the analysis unit 142 and the vehicle characteristic information 151. Specifically; the switching unit 143 determines the vehicle speed of the vehicle 1 based on the detection information from the wheel speed sensor 22 acquired by the acquisition unit 141. The frequency of vibration of the vehicle 1 is calculated based on the road surface condition analyzed and determined by the analysis unit 142, that is, the undulation state of the road surface, such as rough, normal, or flat, and based on the vehicle speed. The switching unit 143 switches the control modes by referring to the frequency of vibration of the vehicle 1 and the vehicle characteristics serving as the threshold values in the vehicle characteristic information 151 stored in advance in the storage unit 150.

The control mode is a mode indicating a level of control related to traveling of the vehicle 1. The level of control is the intensity of control. The switching unit 143 switches the control mode among a plurality of modes with different intensities of control. In the present embodiment, there are three control modes that are the comfort mode, the normal mode, and the sport mode. The normal mode is a mode in which the intensity of control is normal. The comfort mode is a mode in which the intensity of control is lower (i.e., softer) than that of the normal mode. The sport mode is a mode in which the intensity of control is higher (i.e., harder) than that of the normal mode. The normal mode corresponds to a first mode, the comfort mode corresponds to a second mode, and the sport mode corresponds to a third mode. The number of control modes is not limited to this.

Specifically, the control modes are switched by the switching unit 143 under the control of the control unit 140 as follows. FIG. 5 is an explanatory diagram showing the state of levels in individual types of control set in the control modes in the first embodiment.

The control unit 140 controls the vehicle 1 in the control mode selected by the switching performed by the switching unit 143. The damping force control unit 144 of the control unit 140 performs damping force control on the suspension system 30. As shown in FIG. 5, based on the frequency of vibration of the vehicle 1 that is based on the undulation state of the road surface and the vehicle speed and based on the vehicle characteristic information 151, the switching unit 143 switches the normal mode in which the damping force control is performed at a normal intensity, the comfort mode in which the damping force control is performed at an intensity lower than normal, and the sport mode in which the damping force control is performed at an intensity higher than normal.

The spring constant switching control unit 145 of the control unit 140 performs spring constant switching control on the suspension system 30. As shown in FIG. 5, based on the frequency of vibration of the vehicle 1 that is based on the undulation state of the road surface and the vehicle speed and based on the vehicle characteristic information 151, the switching unit 143 switches the normal mode in which the spring constant switching control is performed at a normal intensity, the comfort mode in which the spring constant switching control is performed at an intensity lower than that of the normal mode, and the sport mode in which the spring constant switching control is performed at an intensity higher than that of the normal mode.

The steering control unit 146 of the control unit 140 performs steering control on the steering system 13. As shown in FIG. 5, based on the frequency of vibration of the vehicle 1 that is based on the undulation state of the road surface and the vehicle speed and based on the vehicle characteristic information 151, the switching unit 143 switches the normal mode in which the control gain in the steering control is set to a normal level, the comfort mode in which the control gain is set lower than that of the normal mode, and the sport mode in which the control gain is set higher than that of the normal mode.

The stabilizer control unit 147 of the control unit 140 performs stabilizer control on the vehicle 1. As shown in FIG. 5, based on the frequency of vibration of the vehicle 1 that is based on the undulation state of the road surface and the vehicle speed and based on the vehicle characteristic information 151, the switching unit 143 switches the normal mode in which the stabilizer control is performed at a normal intensity, the comfort mode in which the stabilizer control is performed at an intensity lower than that of the normal mode, and the sport mode in which the stabilizer control is performed at an intensity higher than that of the normal mode.

Next, a vehicle control process to be performed by the vehicle control system 100 according to the present embodiment configured as described above will be described.

FIG. 6 is a flowchart showing an example of a procedure of the vehicle control process to be performed by the vehicle control system 100 according to the first embodiment.

First, the acquisition unit 141 acquires an image of a road surface ahead in the traveling direction of the vehicle 1 that is captured by the imaging unit 15c (S11). The analysis unit 142 analyzes the captured image acquired by the acquisition unit 141, and determines an undulation state of the road surface (S13).

Next, the switching unit 143 calculates a vehicle speed of the vehicle 1 based on a detection signal from the wheel speed sensor 22 that is acquired by the acquisition unit 141 (S17). Next, the switching unit 143 calculates a frequency of vibration of the vehicle 1 based on the undulation state of the road surface and the vehicle speed (S19). Next, the switching unit 143 refers to the vehicle characteristic information 151 in the storage unit 150, and determines a control mode set in the vehicle characteristic information 151 based on the frequency of vibration of the vehicle 1 (S21).

For example, vehicle characteristics felt by occupants, such as a frequency and an unevenness level, are set as the threshold values for switching the control modes. When the switching unit 143 determines that the vibration level in a middle frequency band (e.g., 4 to 8 Hz) of pitching is equal to or higher than a first threshold value (dB) based on the vehicle speed of the vehicle 1 and the undulation state of the road surface ahead, the switching unit 143 switches the control mode from the normal mode to the comfort mode. When the switching unit 143 determines that the vibration level in a low frequency band (e.g., 1 to 3 Hz) of pitching is equal to or higher than a second threshold value (dB) based on the vehicle speed of the vehicle 1 and the undulation state of the road surface ahead through the analysis of the captured image, the switching unit 143 switches the control mode from the comfort mode to the normal mode.

Then, each control unit in the control unit 140 performs each type of control in the control mode determined by the switching unit 143 (S23).

Thus, in the present embodiment, in the vehicle control system 100, the analysis unit 142 analyzes the road surface condition based on the image captured by the imaging unit

15c that captures an image of the road surface in the traveling direction of the vehicle 1, the switching unit 143 switches the control mode indicating the level of control related to the traveling of the vehicle based on the road surface condition and the vehicle characteristics that are based on the detection information from the on-board sensors, and the control unit 140 controls the vehicle 1 in the control mode selected by the switching. Therefore, according to the present embodiment, it is possible to, for example, switch to an optimum control mode based on the vehicle characteristics in response to the road surface condition, thereby reducing the burden on the user.

In the present embodiment, the vehicle characteristics include the heave-related characteristics, the roll-related characteristics, or the pitch-related characteristics of the vehicle 1 that are based on the vertical acceleration, the lateral acceleration, or the longitudinal acceleration detected by the acceleration sensor serving as the on-board sensor or the vehicle height of the vehicle detected by the vehicle height sensor serving as the on-board sensor. Therefore, according to the present embodiment, the control mode is switched, for example, using the vehicle characteristics related to heave, roll, and pitch of the vehicle 1 as the threshold values. It is possible to switch to a more optimum control mode based on the heave, roll, or pitch characteristics of the vehicle in response to the road surface condition, thereby further reducing the burden on the user.

In the present embodiment, the switching unit 143 determines, as the road surface condition, the undulation state of the road surface as rough, normal, or flat, and the switching unit 143 switches the control mode among the plurality of modes with different intensities of control as the levels based on the undulation state of the road surface and the vehicle characteristics. Therefore, according to the present embodiment, it is possible to, for example, switch to an optimum control mode based on the vehicle characteristics in response to the undulation state of the road surface, thereby further reducing the burden on the user. In particular, according to the present embodiment, even when there is no driver and the occupant is unable to grasp the road surface condition as in a case where the vehicle 1 is an autonomous vehicle, the control mode can be switched to an optimum control mode based on the vehicle characteristics in response to the undulation state of the road surface, which is convenient for the occupant.

In the present embodiment, the control mode associated with the road surface condition and the vehicle characteristics is determined in advance as the vehicle characteristic information 151 in the storage unit 150, and the switching unit 143 refers to the vehicle characteristic information 151 and switches the control mode to the control mode determined in association with the road surface condition and the vehicle characteristics. Therefore, according to the present embodiment, for example, when the vehicle characteristics are determined in advance before shipment, the vehicle 1 to be shipped need not be equipped with the on-board sensors for determining the vehicle characteristics, thereby reducing the mounting space in the vehicle 1 and the manufacturing costs of the vehicle 1.

In the present embodiment, the switching unit 143 calculates the frequency of the undulation state of the road surface based on the road surface condition and the speed of the vehicle 1, and switches the control mode based on the calculated frequency and the vehicle characteristics. Therefore, according to the present embodiment, it is possible to, for example, switch to a more optimum control mode based on the vehicle characteristics in response to the undulation state of the road surface, thereby further reducing the burden on the user.

Second Embodiment

In the first embodiment, the control modes based on the vehicle characteristics are determined in advance at the time of shipment using the vehicle characteristic information 151. In the second embodiment, the on-board sensors are mounted on the vehicle 1, the vehicle characteristics are determined while the vehicle 1 is traveling, and the optimum control mode is learned based on the sensor detection information and the vehicle characteristics.

The configuration of a vehicle 1 according to the second embodiment is similar to that of the first embodiment.

Figure 7:
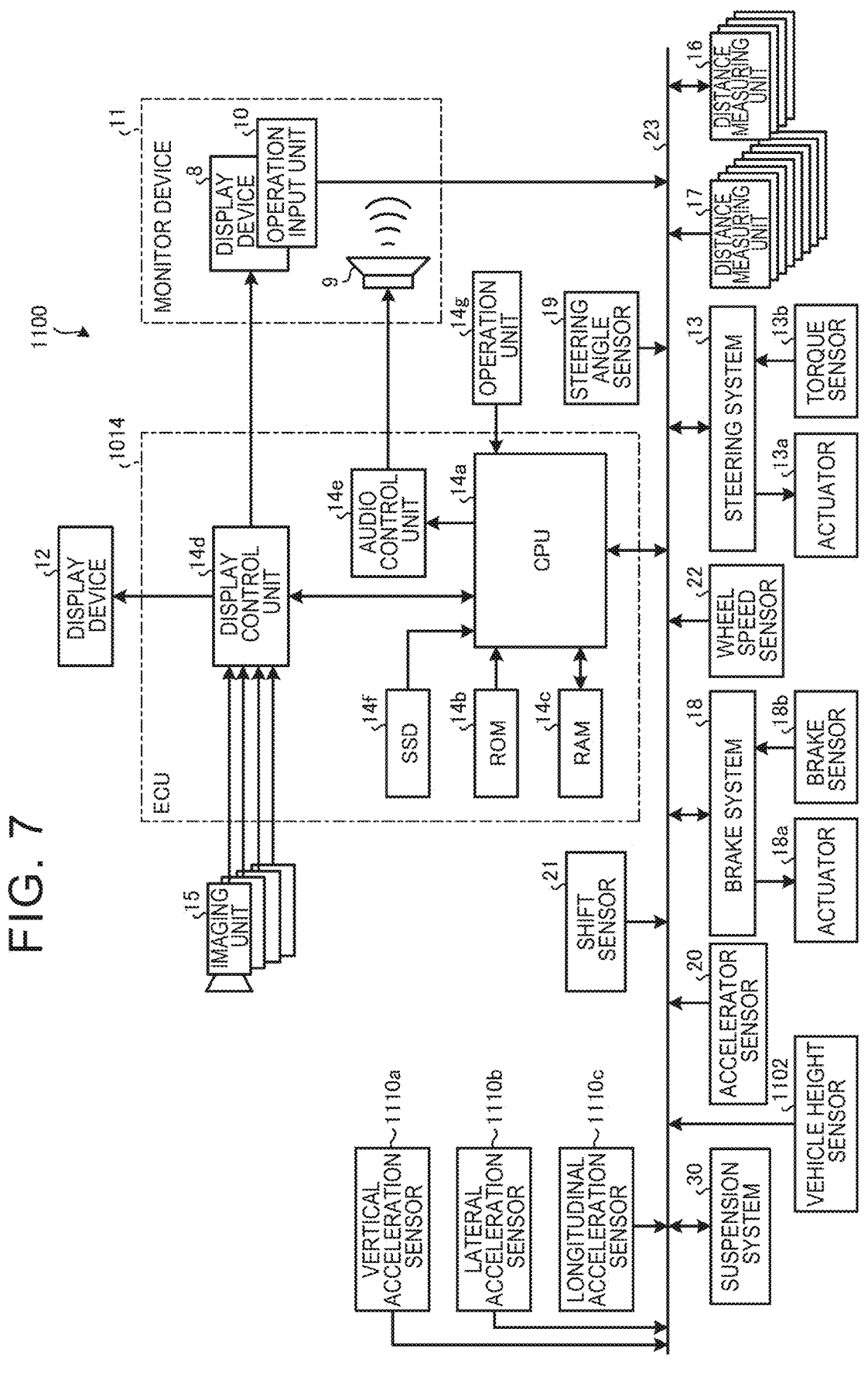
FIG. 7 is an exemplary block diagram of a configuration of a vehicle control system of a vehicle according to a second embodiment.

FIG. 7 is an exemplary block diagram of a configuration of a vehicle control system 1100 of the vehicle according to the second embodiment. The vehicle control system 1100 according to the second embodiment includes a vertical acceleration sensor 1110*a*, a lateral acceleration sensor 1110*b*, a longitudinal acceleration sensor 1110*c*, and a vehicle height sensor 1102 in addition to the configuration of the vehicle control system 100 according to the first embodiment.

The vertical acceleration sensor 1110*a* detects an acceleration acting in the vertical direction of the vehicle 1. The lateral acceleration sensor 1110*b* detects an acceleration acting in the width direction (i.e., the lateral direction) of the vehicle 1. The longitudinal acceleration sensor 1110*c* detects an acceleration acting in the longitudinal direction of the vehicle 1. The vehicle height sensor 1102 detects a vehicle height of the vehicle 1.

In the vehicle control system 1100 according to the second embodiment, the functions performed by an ECU 1014 are different from those of the ECU 14 according to the first embodiment. The other configuration of the vehicle control system 1100 according to the second embodiment is similar to that of the first embodiment.

Figure 8:
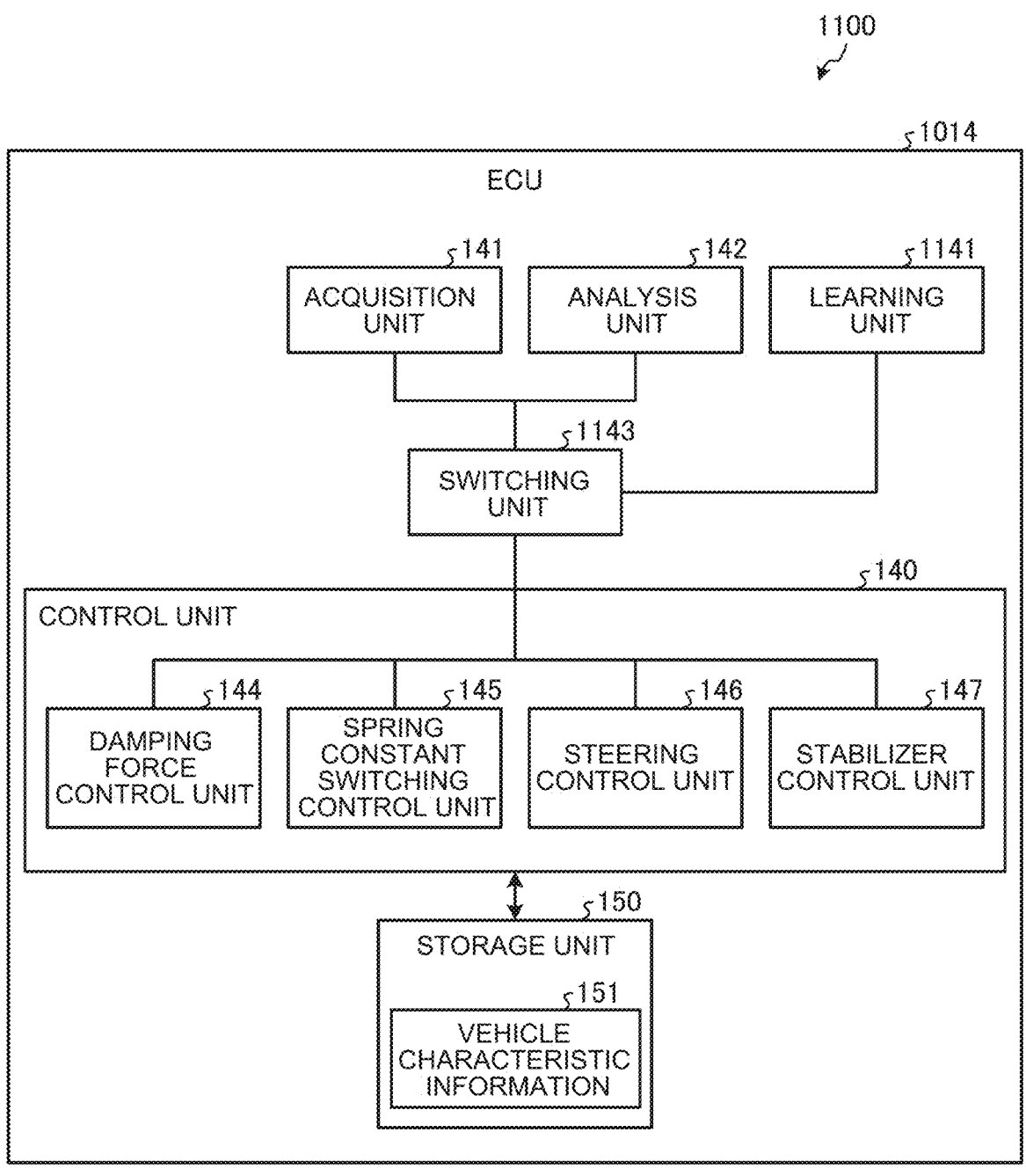
FIG. 8 is a diagram showing an example of a functional configuration of an ECU of the vehicle according to the second embodiment.

Next, an example of a functional configuration of the ECU 1014 of the vehicle 1 according to the present embodiment will be described with reference to FIG. 8. FIG. 8 is a diagram showing the example of the functional configuration of the ECU 1014 of the vehicle according to the second embodiment.

As shown in FIG. 8, the ECU 1014 according to the present embodiment functions as a vehicle control device including at least an acquisition unit 141, an analysis unit 142, a switching unit 1143, a learning unit 1141, a control unit 140, and a storage unit 150. The acquisition unit 141, the analysis unit 142, the control unit 140, and the storage unit 150 are similar to those in the first embodiment.

The learning unit 1141 inputs and learns a road surface condition and detection information while the vehicle 1 is traveling, and changes the threshold values of the vehicle characteristics that are based on the road surface condition and the detection information as the threshold values for switching the control modes, thereby changing the association with the control modes. The switching unit 1143 switches the control mode to the control mode changed by the learning unit 1141.

Through such a learning process, the threshold values such as the vehicle characteristics for switching the control modes are set to threshold values in consideration of deterioration of items that contribute to each type of control in the control unit 140, such as bushes and tires of the suspension system 30. A known method may be used for the learning process algorithm.

Next, a vehicle control process to be performed by the vehicle control system 1100 according to the present embodiment configured as described above will be described.

Figure 9:
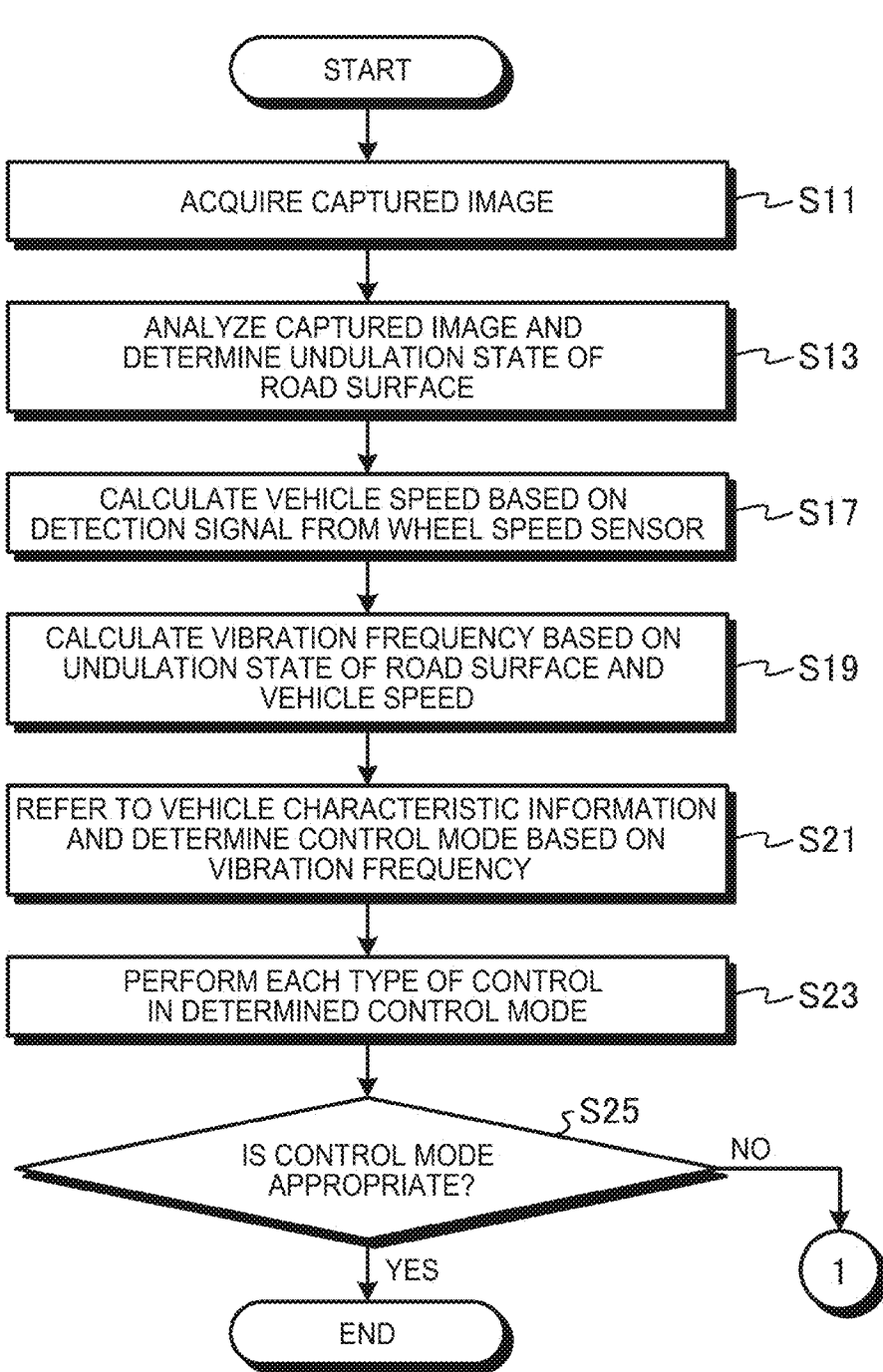
FIG. 9 is a flowchart showing an example of a procedure of a vehicle control process to be performed by the vehicle control system according to the second embodiment.
Figure 10:
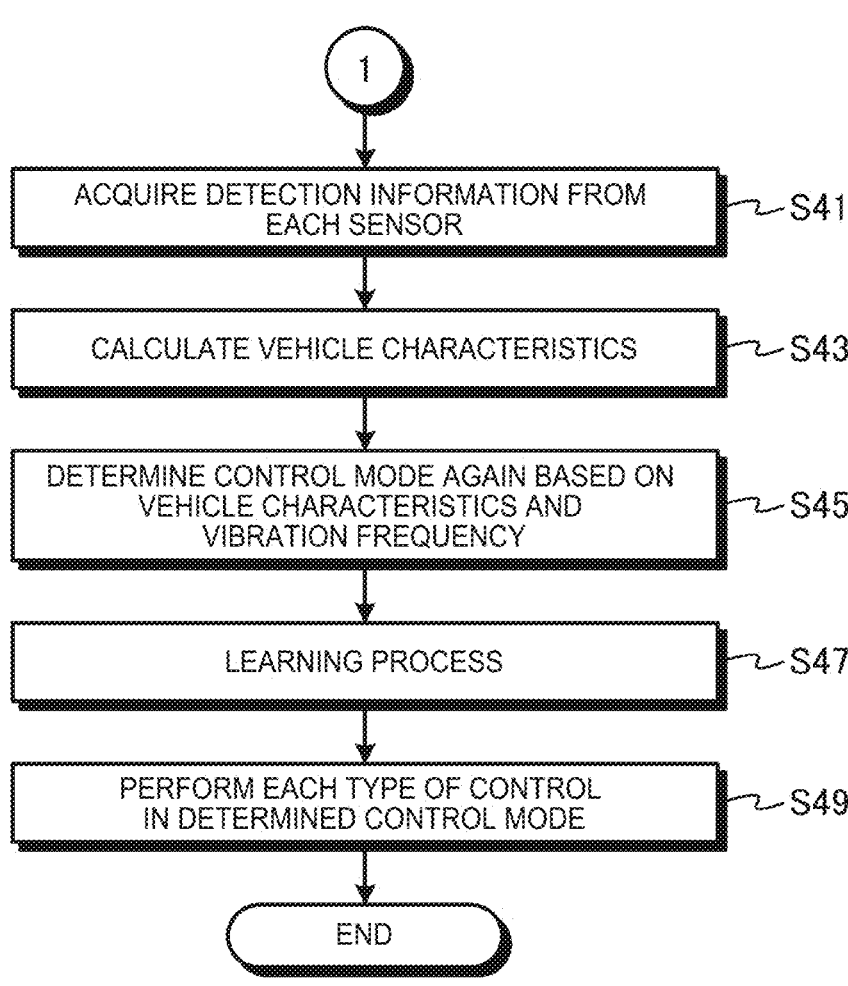
FIG. 10 is a flowchart showing the example of the procedure of the vehicle control process to be performed by the vehicle control system according to the second embodiment.

FIGS. 9 and 10 are flowcharts showing an example of a procedure of the vehicle control process to be performed by the vehicle control system 1100 according to the second embodiment.

The process from S11 to S23 is performed in the same manner as in the first embodiment. A control mode is determined and each type of control is performed in the determined control mode in the same manner as in the first embodiment.

Next, the switching unit 1143 determines whether the determined control mode is appropriate (S25). Specifically, while the vehicle is traveling under each type of control in the control mode, determination is made as to whether the level of each type of control is actually appropriate.

When the determined control mode is appropriate (S25: Yes), the process ends. When the determined control mode is not appropriate (S25: No), the acquisition unit 141 acquires detection information from each sensor (S41). Specifically, the acquisition unit 141 acquires an acceleration acting in the vertical direction of the vehicle 1 from the vertical acceleration sensor 1110*a*, an acceleration acting in the width direction (i.e., the lateral direction) of the vehicle 1 from the lateral acceleration sensor 1110*b*, an acceleration acting in the longitudinal direction of the vehicle 1 from the longitudinal acceleration sensor 1110*c*, and a vehicle height from the vehicle height sensor 1102.

Next, the learning unit 1141 calculates vehicle characteristics based on the acceleration acting in the vertical direction of the vehicle 1 from the vertical acceleration sensor 1110*a*, the acceleration acting in the width direction of the vehicle 1 from the lateral acceleration sensor 1110*b*, the acceleration acting in the longitudinal direction of the vehicle 1 from the longitudinal acceleration sensor 1110*c*, and the vehicle height from the vehicle height sensor 1102, all of which are acquired by the acquisition unit 141 (S43).

Specifically, the learning unit 1141 calculates heave-related characteristics such as a heave speed of the vehicle 1 based on the acceleration acting in the vertical direction of the vehicle 1 detected by the vertical acceleration sensor and the vehicle height detected by the vehicle height sensor. The learning unit 1141 also calculates roll-related characteristics such as a roll speed of the vehicle 1 based on the acceleration acting in the width direction (i.e., the lateral direction) of the vehicle 1 detected by the lateral acceleration sensor. The learning unit 1141 further calculates pitch-related characteristics such as a pitch speed of the vehicle 1 based on the acceleration acting in the longitudinal direction of the vehicle 1 detected by the longitudinal acceleration sensor.

Next, the learning unit 1141 determines the control mode again based on the frequency of vibration of the vehicle 1 calculated in S19 and the vehicle characteristics calculated in S43 (S45). Then, the learning unit 1141 performs the learning process by learning the undulation state of the road surface, the vibration frequency, and the vehicle characteristics in the control mode determined again and registering them in the vehicle characteristic information 151 in association with the control mode (S47). Then, the control unit 140 changes the control mode to the determined control mode and performs each type of control (S49).

For example, it is assumed that the undulation state of the road surface ahead analyzed based on the image captured by the imaging unit 15*c* is determined as being smaller than the actual undulation state due to the strength of sunlight, the magnitude of sun setting, etc. In such a case, it is considered that, even if the control mode is switched to an appropriate mode such as the normal mode by the switching unit 1143, the vertical acceleration acting on the vehicle I will be greater than expected. In such a case, the switching unit 1143 determines in S25 that the level of each type of control is not actually appropriate, and the learning unit 1141 switches, through S41, S43, and S45, the control mode to the comfort mode when the vertical acceleration learned thus far acts.

As described above, in the present embodiment, the vehicle control system 1100 further includes the learning unit 1141 that inputs and learns the road surface condition and the detection information while the vehicle 1 is traveling, and changes the control mode determined in advance for the vehicle characteristics that are based on the road surface condition and the detection information. The switching unit 1143 switches the control mode to the changed control mode. Therefore, according to the present embodiment, for example, the threshold values for switching the control modes can be dynamically changed while the vehicle 1 is traveling. Thus, the control mode can be switched to a more optimum control mode based on the vehicle characteristics in response to the road surface condition, thereby reducing the burden on the user more accurately.

Modifications

Various modifications are conceivable for the first and second embodiments.
For example, audio input means for acquiring road noise or other noise generated due to the road surface condition such as the undulation state of the unevenness of the road surface may be provided in the vehicle cabin, and the switching unit 143, 1143 may switch the control mode based on the road surface condition and a characteristic that is based on the noise. The noise generated due to the undulation state of the unevenness of the road surface includes not only noise transmitted into the vehicle cabin 2*a* but also noise measured outside the vehicle cabin 2*a*.

According to the present modification, the road surface condition can be recognized with higher accuracy. Thus, the control mode can be switched to a more optimum control mode in response to the road surface condition, thereby further reducing the burden on the user.

For example, an acceleration sensor may be provided near the rod of the shock absorber of the suspension system 30, and the switching unit 143, 1143 may switch the control mode based on the road surface condition and a vehicle characteristic that is based on the acceleration of the rod of the shock absorber of the suspension system 30.

According to the present modification, the road surface condition can be recognized with higher accuracy. Thus, the control mode can be switched to a more optimum control mode based on the vehicle characteristics in response to the road surface condition, thereby further reducing the burden on the user.

For example, acceleration sensors may be provided near a portion of the vehicle on the vehicle body 2 side relative to the suspension system 30 (also referred to as a sprung portion) and a portion of the vehicle 1 on the wheel 3 side relative to the suspension system 30 (also referred to as an unsprung portion), and the switching unit 143, 1143 may switch the control mode based on the road surface condition (undulation state) and a vehicle characteristic that is based on a sprung acceleration or an unsprung acceleration.

According to the present modification, the road surface condition can be recognized with higher accuracy. Thus, the control mode can be switched to a more optimum control mode based on the vehicle characteristics in response to the road surface condition, thereby further reducing the burden on the user.

The switching unit 1143 may not only switch the control modes under the control of each control unit collectively as in the above embodiment, but also switch the control modes under the control of each control unit individually or in combination based on the vehicle characteristics etc.

For example, the above example is assumed. That is, it is assumed that the undulation state of the road surface ahead analyzed based on the image captured by the imaging unit 15*c* is determined as being smaller than the actual undulation state due to the strength of sunlight, the magnitude of sun setting, etc. In such a case, it is considered that, even if the control mode is switched to an appropriate mode such as the normal mode by the switching unit 1143, the vertical acceleration will be greater than expected. In this case, the learning unit 1141 and the switching unit 1143 may be configured to switch only the damping force control unit 144 and the spring constant switching control unit 145 to appropriate levels, for example, softer if the level of road noise is greater than expected when the vertical acceleration learned thus far acts.

According to the present modification, the threshold values for switching the control modes can be changed more flexibly while the vehicle 1 is traveling. Thus, the control mode can be switched to a more optimum control mode based on the vehicle characteristics in response to the road surface condition, thereby further reducing the burden on the user.

In the above embodiments and modifications, the CPU 14*a* reads and executes the program stored in the storage device such as the ROM 14*b* or the SSD 14*f* to implement various functional modules such as the acquisition unit 141, the analysis unit 142, the switching unit 143, 1143, the learning unit 1141, the damping force control unit 144, the spring constant switching control unit 145, the steering control unit 146, and the stabilizer control unit 147.

In the above embodiments and modifications, the various functional modules such as the acquisition unit 141, the analysis unit 142, the switching unit 143, 1143, the learning unit 1141, the damping force control unit 144, the spring constant switching control unit 145, the steering control unit 146, and the stabilizer control unit 147 are implemented by the processor such as the CPU 14*a* reading and executing the program stored in the storage device such as the ROM 14*b* or the SSD 14*f*. However, the present disclosure is not limited to this. For example, the various functional modules such as the acquisition unit 141, the analysis unit 142, the switching unit 143, 1143, the learning unit 1141, the damping force control unit 144, the spring constant switching control unit 145, the steering control unit 146, and the stabilizer control unit 147 may be implemented by independent hardware components.

The vehicle control program to be executed by the vehicle control device and the vehicle control system 100, 1100 in the above embodiments and modifications is provided by being pre-installed in a ROM etc.

The vehicle control program to be executed by the vehicle control device and the vehicle control system 100, 1100 in the above embodiments and modifications may be provided by being recorded on a computer-readable recording medium such as a CD-ROM, a flexible disk (FD), a CD-R, or a DVD (Digital Versatile Disk) as a file in an installable or executable format.

The vehicle control program to be executed by the vehicle control device and the vehicle control system 100, 1100 in the above embodiments and modifications may be stored on a computer connected to a network such as the Internet and provided by being downloaded via the network. The vehicle control program to be executed by the vehicle control device and the vehicle control system 100, 1100 in the above embodiments and modifications may be provided or distributed via a network such as the Internet.

The vehicle control program to be executed by the vehicle control device and the vehicle control system 100, 1100 in the above embodiments and modifications has a modular structure including the above units (acquisition unit 141, analysis unit 142, switching unit 143, 1143, learning unit 1141, damping force control unit 144, spring constant switching control unit 145, steering control unit 146, stabilizer control unit 147, etc.). As actual hardware, the CPU reads and executes the vehicle control program from the ROM to load the above units onto the main storage device, and the acquisition unit 141, the analysis unit 142, the switching unit 143, 1143, the learning unit 1141, the damping force control unit 144, the spring constant switching control unit 145, the steering control unit 146, the stabilizer control unit 147, etc. are generated on the main storage device.

Although several embodiments of the present disclosure have been described, these embodiments are presented as examples and are not intended to limit the scope of the disclosure. These novel embodiments can be carried out in various other forms, and various omissions, replacements, and changes can be made without departing from the spirit and scope of the disclosure. These embodiments and their modifications are included in the spirit and scope of the disclosure, and are included in the scope described in the claims and equivalents thereof.

DESCRIPTION OF THE REFERENCE
NUMERALS

1 . . . vehicle, 2 . . . vehicle body, 14, 1014. . . . ECU, 15, 15a, 15b, 15c, 15d . . . imaging unit, 22 . . . wheel speed sensor, 30 . . . suspension system, 100, 1100 . . . vehicle control system, 140 . . . control unit, 141 . . . acquisition unit, 142 . . . analysis unit, 143, 1143 . . . switching unit, 144 . . . damping force control unit, 145 . . . spring constant switching control unit, 146 . . . steering control unit, 147 . . . stabilizer control unit, 150 . . . storage unit, 151 . . . vehicle characteristic information, 1102 . . . vehicle height sensor, 1110a . . . vertical acceleration sensor, 1110b . . . lateral acceleration sensor, 1110c . . . longitudinal acceleration sensor, 1141 . . . learning unit

The invention claimed is:

1. A vehicle control device comprising:
an analysis unit configured to analyze a road surface condition based on a captured image that is captured by an imaging device that captures an image of a road surface in a traveling direction of a vehicle;
a switching unit configured to switch a control mode indicating a level of control related to traveling of the vehicle based on the road surface condition and a vehicle characteristic that is based on detection information from an on-board sensor; and
a control unit configured to control the vehicle in the control mode selected by switching, wherein the vehicle characteristic includes a heave-related characteristic, a roll-related characteristic, or a pitch-related characteristic of the vehicle that is based on a vertical acceleration, a lateral acceleration, or a longitudinal acceleration detected by an acceleration sensor serving as the on-board sensor or a vehicle height of the vehicle detected by a vehicle height sensor serving as the on-board sensor.

2. The vehicle control device according to claim 1, wherein:
the analysis unit is configured to determine, as the road surface condition, an undulation state of the road surface as rough, normal, or flat; and
the switching unit is configured to switch the control mode among a plurality of modes with different intensities of control as the levels based on the undulation state of the road surface and the vehicle characteristic.

3. The vehicle control device according to claim 2, wherein the switching unit is configured to calculate a frequency of the undulation state of the road surface based on the road surface condition and a speed of the vehicle, and switch the control mode based on the calculated frequency and the vehicle characteristic.

4. The vehicle control device according to claim 2, wherein the switching unit is further configured to switch the control mode based on the road surface condition and the vehicle characteristic that is based on noise generated due to the road surface condition.

5. The vehicle control device according to claim 2, wherein:
the control unit includes a damping force control unit configured to perform damping force control on a suspension of the vehicle; and
the switching unit is configured to, based on the undulation state of the road surface and the vehicle characteristic, switch the control mode among a normal mode in which the damping force control is performed by the damping force control unit at a normal intensity, a comfort mode in which the damping force control is performed at an intensity lower than the intensity in the normal mode, and a sport mode in which the damping force control is performed at an intensity higher than the intensity in the normal mode.

6. The vehicle control device according to claim 5, wherein the switching unit is further configured to switch the control mode based on the road surface condition and the vehicle characteristic that is based on an acceleration of a rod of a shock absorber of the suspension or a sprung acceleration or an unsprung acceleration of the suspension.

7. The vehicle control device according to claim 2, wherein:
the control unit includes a spring constant switching control unit configured to perform spring constant switching control on a suspension of the vehicle; and
the switching unit is configured to, based on the undulation state of the road surface and the vehicle characteristic, switch the control mode among a normal mode in which the spring constant switching control is performed by the spring constant switching control unit at a normal intensity, a comfort mode in which the spring constant switching control is performed at an intensity lower than the intensity in the normal mode, and a sport mode in which the spring constant switching control is performed at an intensity higher than the intensity in the normal mode.

8. The vehicle control device according to claim 2, wherein:

the control unit includes a steering control unit configured to perform steering control on a steering system of the vehicle; and the switching unit is configured to, based on the undulation state of the road surface and the vehicle characteristic, switch the control mode among a normal mode in which a control gain in the steering control by the steering control unit is set to a normal level, a comfort mode in which the control gain is set to a level lower than the level in the normal mode, and a sport mode in which the control gain is set to a level higher than the level in the normal mode.

9. The vehicle control device according to claim 2, wherein:

the control unit includes a stabilizer control unit configured to perform stabilizer control on the vehicle; and the switching unit is configured to, based on the undulation state of the road surface and the vehicle characteristic, switch the control mode among a normal mode in which the stabilizer control is performed by the stabilizer control unit at a normal intensity, a comfort mode in which the stabilizer control is performed at an intensity lower than the intensity in the normal mode, and a sport mode in which the stabilizer control is performed at an intensity higher than the intensity in the normal mode.

10. A vehicle control device comprising an analysis unit configured to analyze a road surface condition based on a captured image that is captured by an imaging device that captures an image of a road surface in a traveling direction of a vehicle;

a switching unit configured to switch a control mode indicating a level of control related to traveling of the vehicle based on the road surface condition and a vehicle characteristic that is based on detection information from an on-board sensor; and a control unit configured to control the vehicle in the control mode selected by switching, wherein:

the control mode associated with the road surface condition and the vehicle characteristic is determined in advance; and the switching unit is configured to switch the control mode to the control mode determined in association with the road surface condition and the vehicle characteristic.

11. A vehicle control device comprising an analysis unit configured to analyze a road surface condition based on a captured image that is captured by an imaging device that captures an image of a road surface in a traveling direction of a vehicle;

a switching unit configured to switch a control mode indicating a level of control related to traveling of the vehicle based on the road surface condition and a vehicle characteristic that is based on detection information from an on-board sensor;

a control unit configured to control the vehicle in the control mode selected by switching; and a learning unit configured to input and learn the road surface condition and the detection information while the vehicle is traveling, and change the control mode determined in advance for the vehicle characteristic that is based on the road surface condition and the detection information, wherein the switching unit is configured to switch the control mode to the changed control mode.

* * * * *